US011908485B2

(12) United States Patent
Ravelli et al.

(10) Patent No.: US 11,908,485 B2
(45) Date of Patent: *Feb. 20, 2024

(54) APPARATUS AND METHOD FOR SELECTING ONE OF A FIRST ENCODING ALGORITHM AND A SECOND ENCODING ALGORITHM

(71) Applicant: Fraunhofer-Gesellschaft zur Foerderung der angewandten Forschung e.V., Munich (DE)

(72) Inventors: Emmanuel Ravelli, Erlangen (DE); Stefan Doehla, Erlangen (DE); Guillaume Fuchs, Bubenrath (DE); Eleni Fotopoulou, Nuremberg (DE); Christian Helmrich, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/058,389

(22) Filed: Nov. 23, 2022

(65) Prior Publication Data

US 2023/0079574 A1 Mar. 16, 2023

Related U.S. Application Data

(63) Continuation of application No. 16/836,857, filed on Mar. 31, 2020, now Pat. No. 11,521,631, which is a
(Continued)

(51) Int. Cl.
*G10L 19/22* (2013.01)
*G10L 19/125* (2013.01)
(Continued)

(52) U.S. Cl.
CPC ............ *G10L 19/125* (2013.01); *G10L 19/22* (2013.01); *G10L 19/0212* (2013.01); *G10L 19/08* (2013.01)

(58) Field of Classification Search
CPC ........................................ G10L 19/00–19/265
See application file for complete search history.

(56) References Cited

U.S. PATENT DOCUMENTS 7,020,615 B2 3/2006 Vafin et al.
7,739,120 B2 6/2010 Maekinen
(Continued)

FOREIGN PATENT DOCUMENTS

AU 2008316860 A1 4/2009
CA 2457988 A1 8/2005
(Continued)

OTHER PUBLICATIONS

"ETSI TS 126 290 V11.0.0", Universal Mobile Telecommunications System (UMTS); LTE; Audio codec processing functions; Extended Adaptive Multi-Rate—Wideband (AMR-WB+) codec; Transcoding functions (3GPP TS 26.290 version 11.0.0 Release 11); 2012 Digital cellular telecommunications system (Phase 2+); Technical Specification, European Telecommunications Standards Institute (ETSI), France, (Oct. 1, 2012), vol. 3GPP SA 4, No. V11.0.0, XP014075402.
(Continued)

*Primary Examiner* — Abul K Azad
(74) *Attorney, Agent, or Firm* — Perkins Coie LLP; Michael A. Glenn

(57) ABSTRACT

An apparatus for selecting one of a first encoding algorithm having a first characteristic and a second encoding algorithm having a second characteristic for encoding a portion of an audio signal to obtain an encoded version of the portion of the audio signal has a first estimator for estimating a first
(Continued)

quality measure for the portion of the audio signal, which is associated with the first encoding algorithm, without actually encoding and decoding the portion of the audio signal using the first encoding algorithm. A second estimator is provided for estimating a second quality measure for the portion of the audio signal, which is associated with the second encoding algorithm, without actually encoding and decoding the portion of the audio signal using the second encoding algorithm. The apparatus has a controller for selecting the first or second encoding algorithms based on a comparison between the first and second quality measures.

18 Claims, 4 Drawing Sheets

Related U.S. Application Data continuation of application No. 16/148,993, filed on Oct. 1, 2018, now Pat. No. 10,622,000, which is a continuation of application No. 14/812,138, filed on Jul. 29, 2015, now abandoned, which is a continuation of application No. PCT/EP2014/051557, filed on Jan. 28, 2014.

(60) Provisional application No. 61/758,100, filed on Jan. 29, 2013.

(51) Int. Cl.
*G10L 19/08* (2013.01)
*G10L 19/02* (2013.01)

(56) References Cited

U.S. PATENT DOCUMENTS

| | | | | |
|---|---|---|---|---|
| 7,747,430 | B2 | 6/2010 | Maekinen | |
| 7,873,511 | B2 | 1/2011 | Herre et al. | |
| 9,818,421 | B2 | 11/2017 | Ravelli et al. | |
| 10,224,052 | B2 | 3/2019 | Ravelli et al. | |
| 10,622,000 | B2 * | 4/2020 | Ravelli | G10L 19/125 |
| 11,521,631 | B2 * | 12/2022 | Ravelli | G10L 19/125 |
| 2005/0246164 | A1 | 11/2005 | Ojala et al. | |
| 2005/0267742 | A1 | 12/2005 | Makinen | |
| 2008/0097749 | A1 | 4/2008 | Xie et al. | |
| 2009/0063158 | A1 | 3/2009 | Norden et al. | |
| 2011/0257981 | A1 | 10/2011 | Beack et al. | |
| 2013/0166308 | A1 | 6/2013 | Kawashima et al. | |
| 2013/0332177 | A1 * | 12/2013 | Helmrich | G10L 19/0212 704/500 |
| 2019/0272839 | A1 | 9/2019 | Ravelli et al. | |

FOREIGN PATENT DOCUMENTS

| | | | |
|---|---|---|---|
| CN | 101053020 | A | 10/2007 |
| CN | 101261834 | A | 9/2008 |
| CN | 102099856 | A | 6/2011 |
| CN | 102113051 | A | 6/2011 |
| CN | 103069483 | A | 4/2013 |
| CN | 103493129 | A | 1/2014 |
| EP | 1990799 | A1 | 11/2008 |
| RU | 2335809 | C2 | 10/2008 |
| RU | 2007114276 | A | 10/2008 |
| TW | 200828268 | A | 7/2008 |
| WO | 0237688 | A1 | 5/2002 |
| WO | 02093556 | A1 | 11/2002 |
| WO | 2005078704 | A1 | 8/2005 |
| WO | 2010006717 | A1 | 1/2010 |
| WO | 2011048118 | A1 | 4/2011 |
| WO | 2012110448 | A1 | 8/2012 |

OTHER PUBLICATIONS

ETSI TS 126, 191 V11.0.0 , “Digital cellular telecommunications sytem (Phase 2+); Universal Mobile Telecommunications System (UMTS); LTE;”, Audio codec processing functions; Extended Adaptive Multi-Rate—Wideband (AMR-WB+) codec; Transcoding functions (3GPP TS 26.390 Version 11.0.0 Release 11); Technical Specification, European Telecommunications Standards Institute; ETSI TS 126 290V11.0.0 So, 79 pages.

Mäkinen, Jari , et al., “Low Complex Audio Encoding for Mobile Multimedia”, 63rd IEEE Vehicular Technology Conference, Spring, vol. 1,, pp. 461-465.

Vafin, Renat, “Rate-Distortion Optimized Quantization in Multistage Audio Coding”, IEEE Transaction on Audio, Speech, and Language Processing, vol. 14, No. 1, Dec. 31, 2006, Jan. 2006.

Yinkum, Xue , et al., “, CELP Wide Band Speech Encoding Algorithm Using Subband/Fulloband Multiplexing Technology”, Audio Engineering Dec. 31, 2002—no English translation or abstract available.

* cited by examiner $$SNR = 10 \log_{10} \frac{\sum_{i=1}^{N} x^2(i)}{\sum_{i=1}^{N} (x(i) - y(i))^2}$$

FIG 4A $$SNRseg = \frac{10}{M} \sum_{m=0}^{M-1} \log_{10} \sum_{i=Nm}^{Nm+N-1} \left( \frac{\sum_{i=1}^{N} x^2(i)}{\sum_{i=1}^{N} (x(i) - y(i))^2} \right)$$

FIG 4B

APPARATUS AND METHOD FOR SELECTING ONE OF A FIRST ENCODING ALGORITHM AND A SECOND ENCODING ALGORITHM

CROSS-REFERENCES TO RELATED APPLICATIONS

This application is a continuation of U.S. patent application Ser. No. 16/836,857, filed Mar. 31, 2020, which in turn is a continuation of U.S. application Ser. No. 16/148,993, filed Oct. 1, 2018, now U.S. Pat. No. 10,622,000, issued on Apr. 14, 2020, which is a continuation of U.S. application Ser. No. 14/812,138, filed Jul. 29, 2015, which in turn is a continuation of International Application No. PCT/EP2014/051557, filed Jan. 28, 2014, which claims priority from U.S. Provisional Application No. 61/758,100, filed Jan. 29, 2013, which are each incorporated herein in its entirety by this reference thereto.

The present invention relates to audio coding and, in particular, to switched audio coding, where, for different portions of an audio signal, the encoded signal is generated using different encoding algorithms.

BACKGROUND OF THE INVENTION

Switched audio coders which determine different encoding algorithms for different portions of the audio signal are known. Generally, switched audio coders provide for switching between two different modes, i.e. algorithms, such as ACELP (Algebraic Code Excited Linear Prediction) and TCX (Transform Coded Excitation).

The LPD mode of MPEG USAC (MPEG Unified Speech Audio Coding) is based on the two different modes ACELP and TCX. ACELP provides better quality for speech-like and transient-like signals. TCX provides better quality for music-like and noise-like signals. The encoder decides which mode to use on a frame-by-frame basis. The decision made by the encoder is critical for the codec quality. A single wrong decision can produce a strong artifact, particularly at low-bitrates.

The most-straightforward approach for deciding which mode to use is a closed-loop mode selection, i.e. to perform a complete encoding/decoding of both modes, then compute a selection criteria (e.g. segmental SNR) for both modes based on the audio signal and the coded/decoded audio signals, and finally choose a mode based on the selection criteria.

This approach generally produces a stable and robust decision. However, it also involves a significant amount of complexity, because both modes have to be run at each frame.

To reduce the complexity an alternative approach is the open-loop mode selection. Open-loop selection consists of not performing a complete encoding/decoding of both modes but instead choose one mode using a selection criteria computed with low-complexity. The worst-case complexity is then reduced by the complexity of the least-complex mode (usually TCX), minus the complexity needed to compute the selection criteria. The save in complexity is usually significant, which makes this kind of approach attractive when the codec worst-case complexity is constrained.

The AMR-WB+ standard (defined in the International Standard 3GPP TS 26.290 V6.1.0 December 2004) includes an open-loop mode selection, used to decide between all combinations of ACELP/TCX20/TCX40/TCX80 in a 80 ms frame. It is described in Section 5.2.4 of 3GPP TS 26.290. It is also described in the conference paper "Low Complex Audio Encoding for Mobile, Multimedia, V T C 2006, Makinen et al." and U.S. Pat. No. 7,747,430 B2 and U.S. Pat. No. 7,739,120 B2 going back to the author of this conference paper.

U.S. Pat. No. 7,747,430 B2 discloses an open-loop mode selection based on an analysis of long term prediction parameters. U.S. Pat. No. 7,739,120 B2 discloses an open-loop mode selection based on signal characteristics indicating the type of audio content in respective sections of an audio signal, wherein, if such a selection is not viable, the selection is further based on a statistical evaluation carried out for respectively neighboring sections.

The open-loop mode selection of AMR-WB+ can be described in two main steps. In the first main step, several features are calculated on the audio signal, such as standard deviation of energy levels, low-frequency/high-frequency energy relation, total energy, ISP (immittance spectral pair) distance, pitch lags and gains, spectral tilt. These features are then used to make a choice between ACELP and TCX, using a simple threshold-based classifier. If TCX is selected in the first main step, then the second main step decides between the possible combinations of TCX20/TCX40/TCX80 in a closed-loop manner.

WO 2012/110448 A1 discloses an approach for deciding between two encoding algorithms having different characteristics based on a transient detection result and a quality result of an audio signal. In addition, applying a hysteresis is disclosed, wherein the hysteresis relies on the selections made in the past, i.e. for the earlier portions of the audio signal.

In the conference paper "Low Complex Audio Encoding for Mobile, Multimedia, VTC 2006, Makinen et al.", the closed-loop and open-loop mode selection of AMR-WB+ are compared. Subjective listening tests indicate that the open-loop mode selection performs significantly worse than the closed-loop mode selection. But it is also shown that the open-loop mode selection reduces the worst-case complexity by 40%.

SUMMARY

According to an embodiment, an apparatus for selecting one of a first encoding algorithm comprising a first characteristic and a second encoding algorithm comprising a second characteristic for encoding a portion of an audio signal to acquire an encoded version of the portion of the audio signal, may have: a first estimator for estimating a first quality measure for the portion of the audio signal, which is associated with the first encoding algorithm, without actually encoding and decoding the portion of the audio signal using the first encoding algorithm; a second estimator for estimating a second quality measure for the portion of the audio signal, which is associated with the second encoding algorithm, without actually encoding and decoding the portion of the audio signal using the second encoding algorithm; and a controller for selecting the first encoding algorithm or the second encoding algorithm based on a comparison between the first quality measure and the second quality measure, wherein the second estimator is configured to determine an estimated adaptive codebook distortion for each sub-portion of a plurality of sub-portions of the portion of the audio signal, and wherein the second estimator is further configured to take an innovative codebook into consideration by reducing the estimated adaptive codebook distortion determined for each sub-portion of the portion of the audio signal using a constant factor.

According to another embodiment, an apparatus for encoding a portion of an audio signal, may have the inventive apparatus for selecting, a first encoder stage for performing the first encoding algorithm and a second encoder stage for performing the second encoding algorithm, wherein the apparatus for encoding is configured to encode the portion of the audio signal using the first encoding algorithm or the second encoding algorithm depending on the selection by the controller.

Another embodiment may have the system for encoding and decoding comprising an inventive apparatus for encoding and a decoder configured to receive the encoded version of the portion of the audio signal and an indication of the algorithm used to encode the portion of the audio signal and to decode the encoded version of the portion of the audio signal using the indicated algorithm.

According to another embodiment, a method for selecting one of a first encoding algorithm comprising a first characteristic and a second encoding algorithm comprising a second characteristic for encoding a portion of an audio signal to acquire an encoded version of the portion of the audio signal, may have the steps of: estimating a first quality measure for the portion of the audio signal, which is associated with the first encoding algorithm, without actually encoding and decoding the portion of the audio signal using the first encoding algorithm; estimating a second quality measure for the portion of the audio signal, which is associated with the second encoding algorithm, without actually encoding and decoding the portion of the audio signal using the second coding algorithm; and selecting the first encoding algorithm or the second encoding algorithm based on a comparison between the first quality measure and the second quality measure, wherein estimating the second quality measure comprises determining an estimated adaptive codebook distortion for each sub-portion of a plurality of sub-portions of the portion of the audio signal, and taking an innovative codebook into consideration by reducing the estimated adaptive codebook distortion determined for each sub-portion of the portion of the audio signal using a constant factor.

Another embodiment may have a non-transitory digital storage medium having a computer program stored thereon to perform, when said computer program is run by a computer, a method for selecting one of a first encoding algorithm comprising a first characteristic and a second encoding algorithm comprising a second characteristic for encoding a portion of an audio signal to acquire an encoded version of the portion of the audio signal, having the steps of: estimating a first quality measure for the portion of the audio signal, which is associated with the first encoding algorithm, without actually encoding and decoding the portion of the audio signal using the first encoding algorithm; estimating a second quality measure for the portion of the audio signal, which is associated with the second encoding algorithm, without actually encoding and decoding the portion of the audio signal using the second coding algorithm; and selecting the first encoding algorithm or the second encoding algorithm based on a comparison between the first quality measure and the second quality measure, wherein estimating the second quality measure comprises determining an estimated adaptive codebook distortion for each sub-portion of a plurality of sub-portions of the portion of the audio signal, and taking an innovative codebook into consideration by reducing the estimated adaptive codebook distortion determined for each sub-portion of the portion of the audio signal using a constant factor.

Embodiments of the invention provide an apparatus for selecting one of a first encoding algorithm having a first characteristic and a second encoding algorithm having a second characteristic for encoding a portion of an audio signal to obtain an encoded version of the portion of the audio signal, comprising:

a first estimator for estimating a first quality measure for the portion of the audio signal, which is associated with the first encoding algorithm, without actually encoding and decoding the portion of the audio signal using the first encoding algorithm;

a second estimator for estimating a second quality measure for the portion of the audio signal, which is associated with the second encoding algorithm, without actually encoding and decoding the portion of the audio signal using the second encoding algorithm; and a controller for selecting the first encoding algorithm or the second encoding algorithm based on a comparison between the first quality measure and the second quality measure.

Embodiments of the invention provide a method for selecting one of a first encoding algorithm having a first characteristic and a second encoding algorithm having a second characteristic for encoding a portion of an audio signal to obtain an encoded version of the portion of the audio signal, comprising:

estimating a first quality measure for the portion of the audio signal, which is associated with the first encoding algorithm, without actually encoding and decoding the portion of the audio signal using the first encoding algorithm;

estimating a second quality measure for the portion of the audio signal, which is associated with the second encoding algorithm, without actually encoding and decoding the portion of the audio signal using the second encoding algorithm; and selecting the first encoding algorithm or the second encoding algorithm based on a comparison between the first quality measure and the second quality measure.

Embodiments of the invention are based on the recognition that an open-loop selection with improved performance can be implemented by estimating a quality measure for each of first and second encoding algorithms and selecting one of the encoding algorithms based on a comparison between the first and second quality measures. The quality measures are estimated, i.e. the audio signal is not actually encoded and decoded to obtain the quality measures. Thus, the quality measures can be obtained with reduced complexity. The mode selection may then be performed using the estimated quality measures comparable to a closed-loop mode selection.

In embodiments of the invention, an open-loop mode selection where the segmental SNR of ACELP and TCX are first estimated with low complexity is implemented. And then the mode selection is performed using these estimated segmental SNR values, like in a closed-loop mode selection.

Embodiments of the invention do not employ a classical features+classifier approach like it is done in the open-loop mode selection of AMR-WB+. But instead, embodiments of the invention try to estimate a quality measure of each mode and select the mode that gives the best quality.

BRIEF DESCRIPTION OF THE DRAWINGS

Embodiments of the present invention will be detailed subsequently referring to the appended drawings, in which:

FIGS. 4a and 4b are possible representations of SNR and segmental SNR.

DETAILED DESCRIPTION OF THE INVENTION

Figure 1:
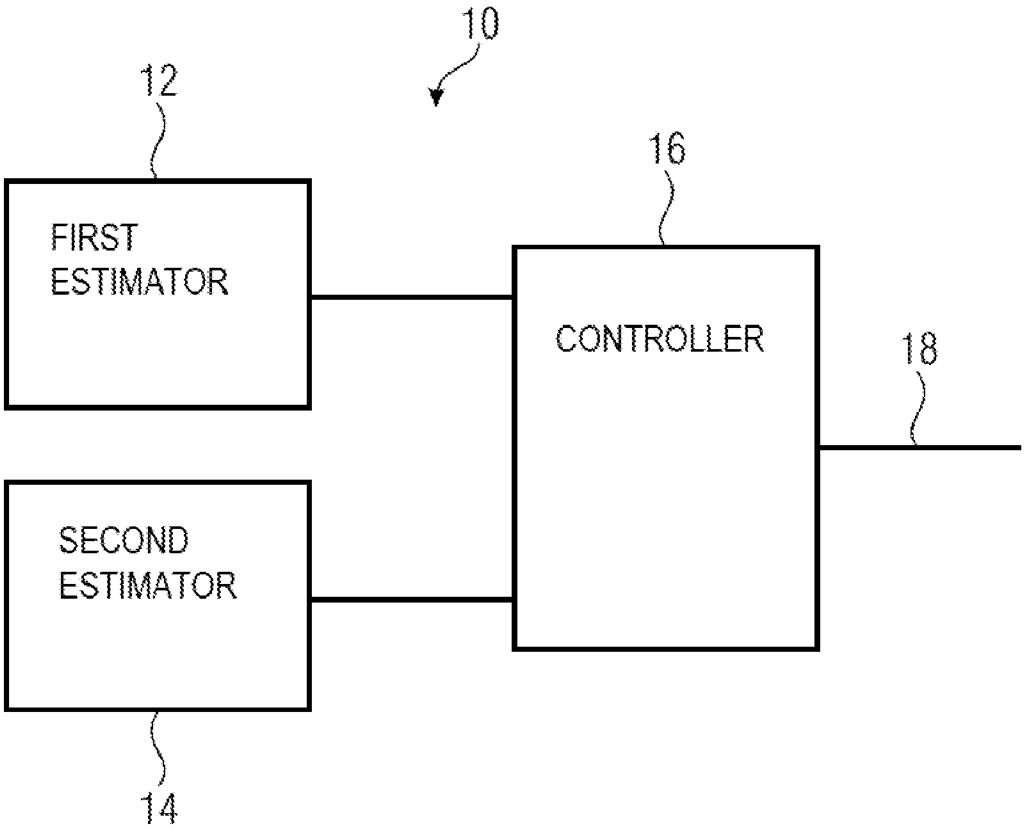
FIG. 1 shows a schematic view of an embodiment of an apparatus for selecting one of a first encoding algorithm and a second encoding algorithm.

In the following description, similar elements/steps in the different drawings are referred to by the same reference signs. It is to be noted that in the drawings features, such as signal connections and the like, which are not necessary in understanding the invention have been omitted.

FIG. 1 shows an apparatus 10 for selecting one of a first encoding algorithm, such as a TCX algorithm, and a second encoding algorithm, such as an ACELP algorithm, as the encoder for encoding a portion of an audio signal. The apparatus 10 comprises a first estimator 12 for estimating a first quality measure for the signal portion. The first quality measure is associated with the first encoding algorithm. In other words, the first estimator 12 estimates a first quality measure which the portion of the audio signal would have if encoded and decoded using the first encoding algorithm, without actually encoding and decoding the portion of the audio signal using the first encoding algorithm. The apparatus 10 comprises a second estimator 14 for estimating a second quality measure for the signal portion. The second quality measure is associated with the second encoding algorithm. In other words, the second estimator 14 estimates the second quality measure which the portion of the audio signal would have if encoded and decoded using the second encoding algorithm, without actually encoding and decoding the portion of the audio signal using the second encoding algorithm. Moreover, the apparatus 10 comprises a controller 16 for selecting the first encoding algorithm or the second encoding algorithm based on a comparison between the first quality measure and the second quality measure. The controller may comprise an output 18 indicating the selected encoding algorithm.

In an embodiment, the first characteristic associated with the first encoding algorithm is better suited for music-like and noise-like signals, and the second encoding characteristic associated with the second encoding algorithm is better suited for speech-like and transient-like signals. In embodiments of the invention, the first encoding algorithm is an audio coding algorithm, such as a transform coding algorithm, e.g. a MDCT (modified discrete cosine transform) encoding algorithm, such as a TCX (transform coding excitation) encoding algorithm. Other transform coding algorithms may be based on an FFT transform or any other transform or filterbank. In embodiments of the invention, the second encoding algorithm is a speech encoding algorithm, such as a CELP (code excited linear prediction) coding algorithm, such as an ACELP (algebraic code excited linear prediction) coding algorithm.

In embodiments the quality measure represents a perceptual quality measure. A single value which is an estimation of the subjective quality of the first coding algorithm and a single value which is an estimation of the subjective quality of the second coding algorithm may be computed. The encoding algorithm which gives the best estimated subjective quality may be chosen just based on the comparison of these two values. This is different from what is done in the AMR-WB+ standard where many features representing different characteristics of the signal are computed and, then, a classifier is applied to decide which algorithm to choose.

In embodiments, the respective quality measure is estimated based on a portion of the weighted audio signal, i.e. a weighted version of the audio signal. In embodiments, the weighted audio signal can be defined as an audio signal filtered by a weighting function, where the weighting function is a weighted LPC filter A(z/g) with A(z) an LPC filter and g a weight between 0 and 1 such as 0.68. It turned out that good measures of perceptual quality can be obtained in this manner. Note that the LPC filter A(z) and the weighted LPC filter A(z/g) are determined in a pre-processing stage and that they are also used in both encoding algorithms. In other embodiments, the weighting function may be a linear filter, a FIR filter or a linear prediction filter.

In embodiments, the quality measure is the segmental SNR (signal to noise ratio) in the weighted signal domain. It turned out that the segmental SNR in the weighted signal domain represents a good measure of the perceptual quality and, therefore, can be used as the quality measure in a beneficial manner. This is also the quality measure used in both ACELP and TCX encoding algorithms to estimate the encoding parameters.

Another quality measure may be the SNR in the weighted signal domain. Other quality measures may be the segmental SNR, the SNR of the corresponding portion of the audio signal in the non-weighted signal domain, i.e. not filtered by the (weighted) LPC coefficients. Other quality measures may be the cepstral distortion or the noise-to-mask ratio (NMR).

Generally, SNR compares the original and processed audio signals (such as speech signals) sample by sample. Its goal is to measure the distortion of waveform coders that reproduce the input waveform. SNR may be calculated as shown in FIG. 5a, where x(i) and y(i) are the original and the processed samples indexed by i and N is the total number of samples. Segmental SNR, instead of working on the whole signal, calculates the average of the SNR values of short segments, such as 1 to 10 ms, such as 5 ms. SNR may be calculated as shown in FIG. 5b, where N and M are the segment length and the number of segments, respectively.

In embodiments of the invention, the portion of the audio signal represents a frame of the audio signal which is obtained by windowing the audio signal and selection of an appropriate encoding algorithm is performed for a plurality of successive frames obtained by windowing an audio signal. In the following specification, in connection with the audio signal, the terms "portion" and "frame" are used in an exchangeable manner. In embodiments, each frame is divided into subframes and segmental SNR is estimated for each frame by calculating SNR for each subframe, converted in dB and calculating the average of the subframe SNRs in dB.

Thus, in embodiments, it is not the (segmental) SNR between the input audio signal and the decoded audio signal that is estimated, but the (segmental) SNR between the weighted input audio signal and the weighted decoded audio signal is estimated. As far as this (segmental) SNR is concerned, reference can be made to chapter 5.2.3 of the AMR-WB+ standard (International Standard 3GPP TS 26.290 V6.1.0 December 2004).

In embodiments of the invention, the respective quality measure is estimated based on the energy of a portion of the weighted audio signal and based on an estimated distortion introduced when encoding the signal portion by the respective algorithm, wherein the first and second estimators are configured to determine the estimated distortions dependent on the energy of a weighted audio signal.

In embodiments of the invention, an estimated quantizer distortion introduced by a quantizer used in the first encoding algorithm when quantizing the portion of the audio signal is determined and the first quality measure is determined based on the energy of the portion of the weighted audio signal and the estimated quantizer distortion. In such embodiments, a global gain for the portion of the audio signal may be estimated such that the portion of the audio signal would produce a given target bitrate when encoded with a quantizer and an entropy encoder used in the first encoding algorithm, wherein the estimated quantizer distortion is determined based on the estimated global gain. In such embodiments, the estimated quantizer distortion may be determined based on a power of the estimated gain. When the quantizer used in the first encoding algorithm is a uniform scalar quantizer, the first estimator may be configured to determine the estimated quantizer distortion using the formula D=G*G/12, wherein D is the estimated quantizer distortion and G is the estimated global gain. In case the first encoding algorithm uses another quantizer, the quantizer distortion may be determined form the global gain in a different manner.

The inventors recognized that a quality measure, such as a segmental SNR, which would be obtained when encoding and decoding the portion of the audio signal using the first encoding algorithm, such as the TCX algorithm, can be estimated in an appropriate manner by using the above features in any combination thereof.

In embodiments of the invention, the first quality measure is a segmental SNR and the segmental SNR is estimated by calculating an estimated SNR associated with each of a plurality of sub-portions of the portion of the audio signal based on an energy of the corresponding sub-portion of the weighted audio signal and the estimated quantizer distortion and by calculating an average of the SNRs associated with the sub-portions of the portion of the weighted audio signal to obtain the estimated segmental SNR for the portion of the weighted audio signal.

In embodiments of the invention, an estimated adaptive codebook distortion introduced by an adaptive codebook used in the second encoding algorithm when using the adaptive codebook to encode the portion of the audio signal is determined, and the second quality measure is estimated based on an energy of the portion of the weighted audio signal and the estimated adaptive codebook distortion.

In such embodiments, for each of a plurality of sub-portions of the portion of the audio signal, the adaptive codebook may be approximated based on a version of the sub-portion of the weighted audio signal shifted to the past by a pitch-lag determined in a pre-processing stage, an adaptive codebook gain may be estimated such that an error between the sub-portion of the portion of the weighted audio signal and the approximated adaptive codebook is minimized, and an estimated adaptive codebook distortion may be determined based on the energy of an error between the sub-portion of the portion of the weighted audio signal and the approximated adaptive codebook scaled by the adaptive codebook gain.

In embodiments of the invention, the estimated adaptive codebook distortion determined for each sub-portion of the portion of the audio signal may be reduced by a constant factor in order to take into consideration a reduction of the distortion which is achieved by an innovative codebook in the second encoding algorithm.

In embodiments of the invention, the second quality measure is a segmental SNR and the segmental SNR is estimated by calculating an estimated SNR associated with each sub-portion based on the energy the corresponding sub-portion of the weighted audio signal and the estimated adaptive codebook distortion and by calculating an average of the SNRs associated with the sub-portions to obtain the estimated segmental SNR.

In embodiments of the invention, the adaptive codebook is approximated based on a version of the portion of the weighted audio signal shifted to the past by a pitch-lag determined in a pre-processing stage, an adaptive codebook gain is estimated such that an error between the portion of the weighted audio signal and the approximated adaptive codebook is minimized, and the estimated adaptive codebook distortion is determined based on the energy between the portion of the weighted audio signal and the approximated adaptive codebook scaled by the adaptive codebook gain. Thus, the estimated adaptive codebook distortion can be determined with low complexity.

The inventors recognized that the quality measure, such as a segmental SNR, which would be obtained when encoding and decoding the portion of the audio signal using the second encoding algorithm, such as an ACELP algorithm, can be estimated in an appropriate manner by using the above features in any combination thereof.

In embodiments of the invention, a hysteresis mechanism is used in comparing the estimated quality measures. This can make the decision which algorithm is to be used more stable. The hysteresis mechanism can depend on the estimated quality measures (such as the difference therebetween) and other parameters, such as statistics about previous decisions, the number of temporally stationary frames, transients in the frames. As far as such hysteresis mechanisms are concerned, reference can be made to WO 2012/110448 A1, for example.

In embodiments of the invention, an encoder for encoding an audio signal comprises the apparatus 10, a stage for performing the first encoding algorithm and a stage for performing the second encoding algorithm, wherein the encoder is configured to encode the portion of the audio signal using the first encoding algorithm or the second encoding algorithm depending on the selection by the controller 16. In embodiments of the invention, a system for encoding and decoding comprises the encoder and a decoder configured to receive the encoded version of the portion of the audio signal and an indication of the algorithm used to encode the portion of the audio signal and to decode the encoded version of the portion of the audio signal using the indicated algorithm.

Figure 2:
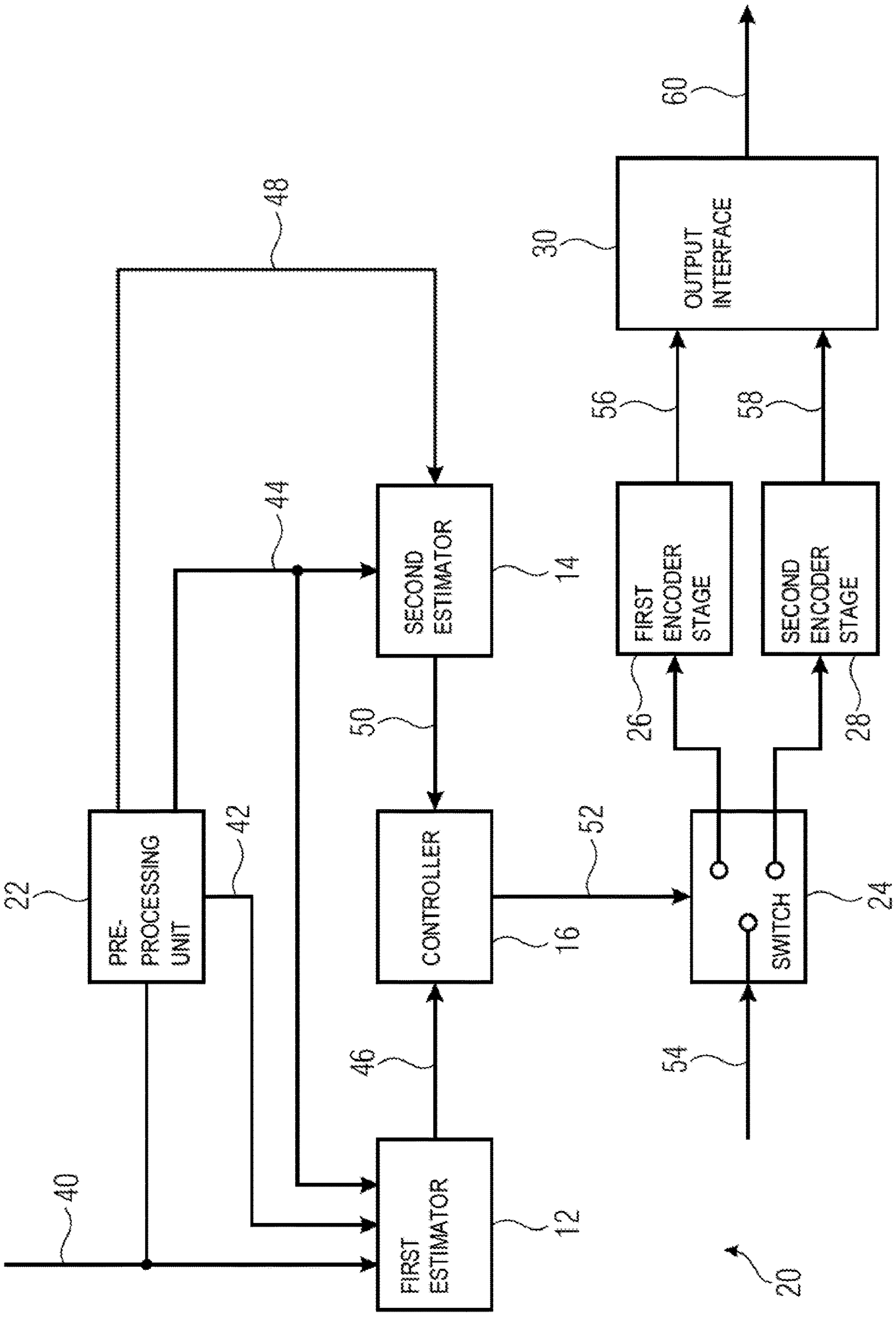
FIG. 2 shows a schematic view of an embodiment of an apparatus for encoding an audio signal.
Figure 3:
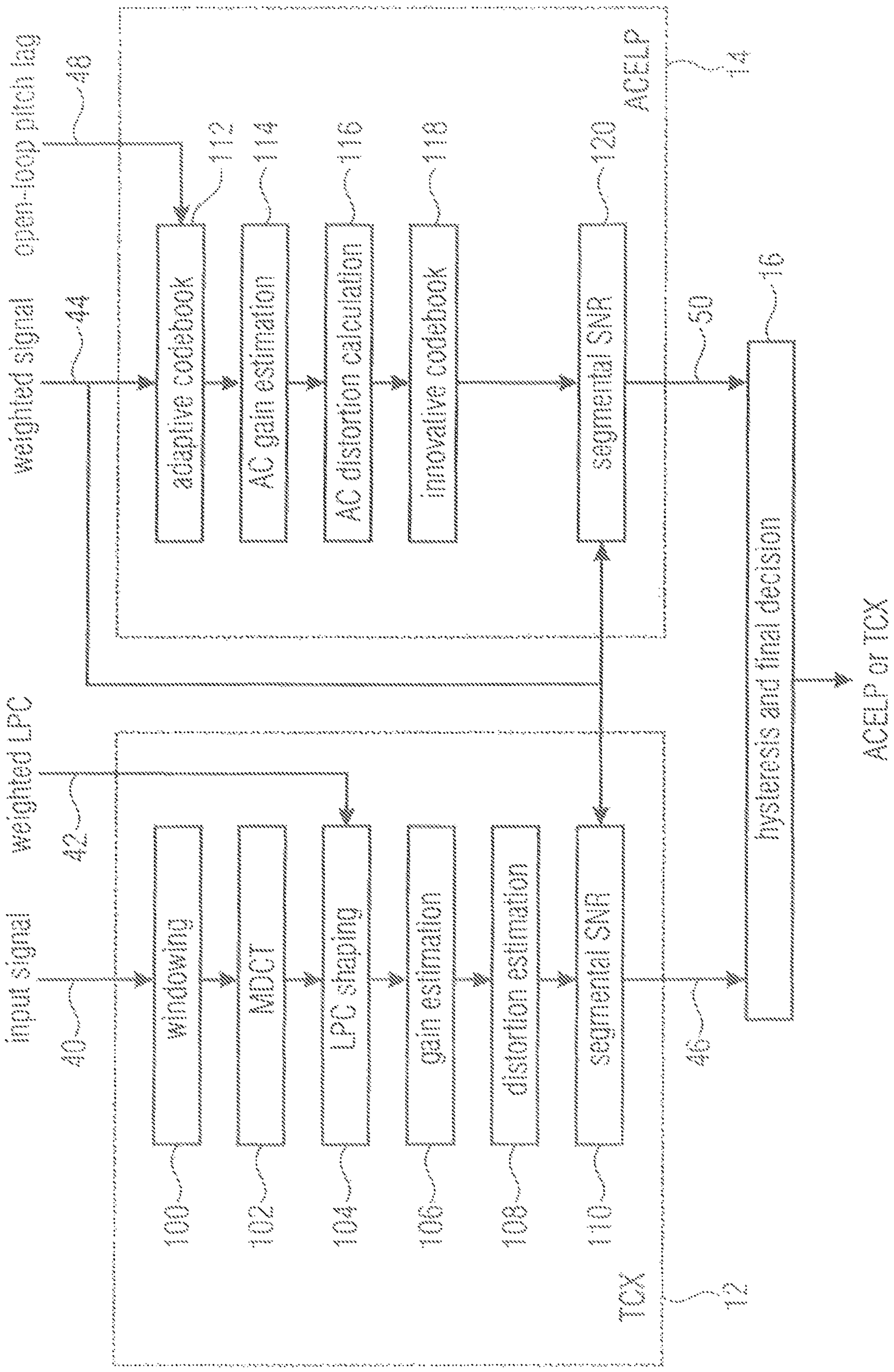
FIG. 3 shows a schematic view of an embodiment of an apparatus for selecting one of a first encoding algorithm and a second encoding algorithm.

Before describing an embodiment of the first estimator 12 and the second estimator 14 in detail referring to FIG. 3, an embodiment of an encoder 20 is described referring to FIG. 2.

The encoder 20 comprises the first estimator 12, the second estimator 14, the controller 16, a pre-processing unit 22, a switch 24, a first encoder stage 26 configured to perform a TCX algorithm, a second encoder stage 28 configured to perform an ACELP algorithm, and an output interface 30. The pre-processing unit 22 may be part of a common USAC encoder and may be configured to output the LPC coefficients, the weighted LPC coefficients, the weighted audio signal, and a set of pitch lags. It is to be noted that all these parameters are used in both encoding algorithms, i.e. the TCX algorithm and the ACELP algorithm. Thus, such parameters have not to be computed for the open-loop mode decision additionally. The advantage of using already computed parameters in the open-loop mode decision is complexity saving.

An input audio signal 40 is provided on an input line. The input audio signal 40 is applied to the first estimator 12, the pre-processing unit 22 and both encoder stages 26, 28. The pre-processing unit 22 processes the input audio signal in a conventional manner to derive LPC coefficients and weighted LPC coefficients 42 and to filter the audio signal 40 with the weighted LPC coefficients 42 to obtain the weighted audio signal 44. The pre-processing unit 22 outputs the weighted LPC coefficients 42, the weighted audio signal 44 and a set of pitch-lags 48. As understood by those skilled in the art, the weighted LPC coefficients 42 and the weighted audio signal 44 may be segmented into frames or sub-frames. The segmentation may be obtained by windowing the audio signal in an appropriate manner.

In embodiments of the invention, quantized LPC coefficients or quantized weighted LPC coefficients may be used. Thus, it should be understood that the term "LPC coefficients" is intended to encompass "quantized LPC coefficients" as well, and the term "weighted LPC coefficients" is intended to encompass "weighted quantized LPC coefficients" as well. In this regard, it is worthwhile to note that the TCX algorithm of USAC uses the quantized weighted LPC coefficients to shape the MCDT spectrum.

The first estimator 12 receives the audio signal 40, the weighted LPC coefficients 42 and the weighted audio signal 44, estimates the first quality measure 46 based thereon and outputs the first quality measure to the controller 16. The second estimator 16 receives the weighted audio signal 44 and the set of pitch lags 48, estimates the second quality measure 50 based thereon and outputs the second quality measure 50 to the controller 16. As known to those skilled in the art, the weighted LPC coefficients 42, the weighted audio signal 44 and the set of pitch lags 48 are already computed in a previous module (i.e. the pre-processing unit 22) and, therefore, are available for no cost.

The controller takes a decision to select either the TCX algorithm or the ACELP algorithm based on a comparison of the received quality measures. As indicated above, the controller may use a hysteresis mechanism in deciding which algorithm to be used. Selection of the first encoder stage 26 or the second encoder stage 28 is schematically shown in FIG. 2 by means of switch 24 which is controlled by a control signal 52 output by the controller 16. The control signal 52 indicates whether the first encoder stage 26 or the second encoder stage 28 is to be used. Based on the control signal 52, the signals that may be used and are schematically indicated by arrow 54 in FIG. 2 and at least including the LPC coefficients, the weighted LPC coefficients, the audio signal, the weighted audio signal, the set of pitch lags are applied to either the first encoder stage 26 or the second encoder stage 28. The selected encoder stage applies the associated encoding algorithm and outputs the encoded representation 56 or 58 to the output interface 30. The output interface 30 may be configured to output an encoded audio signal which may comprise among other data the encoded representation 56 or 58, the LPC coefficients or weighted LPC coefficients, parameters for the selected encoding algorithm and information about the selected encoding algorithm.

Specific embodiments for estimating the first and second quality measures, wherein the first and second quality measures are segmental SNRs in the weighted signal domain are now described referring to FIG. 3. FIG. 3 shows the first estimator 12 and the second estimator 14 and the functionalities thereof in the form of flowcharts showing the respective estimation step-by-step.

Estimation of the TCX Segmental SNR

The first (TCX) estimator receives the audio signal 40 (input signal), the weighted LPC coefficients 42 and the weighted audio signal 44 as inputs.

In step 100, the audio signal 40 is windowed. Windowing may take place with a 10 ms low-overlap sine window. When the past-frame is ACELP, the block-size may be increased by 5 ms, the left-side of the window may be rectangular and the windowed zero impulse response of the ACELP synthesis filter may be removed from the windowed input signal. This is similar as what is done in the TCX algorithm. A frame of the audio signal 40, which represents a portion of the audio signal, is output from step 100.

In step 102, the windowed audio signal, i.e. the resulting frame, is transformed with a MDCT (modified discrete cosine transform). In step 104 spectrum shaping is performed by shaping the MDCT spectrum with the weighted LPC coefficients.

In step 106 a global gain G is estimated such that the weighted spectrum quantized with gain G would produce a given target R, when encoded with an entropy coder, e.g. an arithmetic coder. The term "global gain" is used since one gain is determined for the whole frame.

An example of an implementation of the global gain estimation is now explained. It is to be noted that this global gain estimation is appropriate for embodiments in which the TCX encoding algorithm uses a scalar quantizer with an arithmetic encoder. Such a scalar quantizer with an arithmetic encoder is assumed in the MPEG USAC standard.

Initialization

Firstly, variables used in gain estimation are initialized by:

1. Set en[i]=9.0+10.0*log 10(c[41+0]+c[41+1]+c[41+2]+c[41+3]),
   where 0<=i<L/4, c[ ] is the vector of coefficients to quantize, and L is the length of c[ ].
2. Set fac=128, offset=fac and target=any value (e.g. 1000)

Iteration

Then, the following block of operations is performed NITER times (e.g. here, NITER=10).

1. fac=fac/2
2. offset=offset−fac
3. ener=0
4. for every i where 0<=i<L/4 do the following:
   if en[i]-offset>3.0, then ener=ener+en[i]-offset
5. if ener>target, then offset=offset+fac The result of the iteration is the offset value. After the iteration, the global gain is estimated as G=10^(offset/20).

The specific manner in which the global gain is estimated may vary dependent on the quantizer and the entropy coder used. In the MPEG USAC standard a scalar quantizer with an arithmetic encoder is assumed. Other TCX approaches may use a different quantizer and it is understood by those skilled in the art how to estimate the global gain for such different quantizers. For example, the AMR-WB+ standard assumes that a RE8 lattice quantizer is used. For such a quantizer, estimation of the global gain could be estimated as described in chapter 5.3.5.7 on page 34 of 3GPP TS 26.290 V6.1.0 December 2004, wherein a fixed target bitrate is assumed.

After having estimated the global gain in step 106, distortion estimation takes place in step 108. To be more specific, the quantizer distortion is approximated based on the estimated global gain. In the present embodiment it is assumed that a uniform scalar quantizer is used. Thus, the quantizer distortion is determined with the simple formula D=G*G/12, in which D represents the determined quantizer distortion and G represents the estimated global gain. This corresponds to the high-rate approximation of a uniform scalar quantizer distortion.

Based on the determined quantizer distortion, segmental SNR calculation is performed in step 110. The SNR in each sub-frame of the frame is calculated as the ratio of the weighted audio signal energy and the distortion D which is assumed to be constant in the subframes. For example the frame is split into four consecutive sub-frames (see FIG. 4). The segmental SNR is then the average of the SNRs of the four sub-frames and may be indicated in dB.

This approach permits estimation of the first segmental SNR which would be obtained when actually encoding and decoding the subject frame using the TCX algorithm, however without having to actually encode and decode the audio signal and, therefore, with a strongly reduced complexity and reduced computing time.

Estimation of the ACELP Segmental SNR

The second estimator 14 receives the weighted audio signal 44 and the set of pitch lags 48 which is already computed in the pre-processing unit 22.

As shown in step 112, in each sub-frame, the adaptive codebook is approximated by simply using the weighted audio signal and the pitch-lag T. The adaptive codebook is approximated by $$xw(n-T),\ n=0, \ldots ,N$$

wherein xw is the weighted audio signal, T is the pitch-lag of the corresponding subframe and N is the sub-frame length. Accordingly, the adaptive codebook is approximated by using a version of the sub-frame shifted to the past by T. Thus, in embodiments of the invention, the adaptive codebook is approximated in a very simple manner.

In step 114, an adaptive codebook gain for each sub-frame is determined. To be more specific, in each sub-frame, the codebook gain G is estimated such that it minimizes the error between the weighted audio signal and the approximated adaptive-codebook. This can be done by simply comparing the differences between both signals for each sample and finding a gain such that the sum of these differences is minimal.

In step 116, the adaptive codebook distortion for each sub-frame is determined. In each sub-frame, the distortion D introduced by the adaptive codebook is simply the energy of the error between the weighted audio signal and the approximated adaptive-codebook scaled by the gain G.

The distortions determined in step 116 may be adjusted in an optional step 118 in order to take the innovative codebook into consideration. The distortion of the innovative codebook used in ACELP algorithms may be simply estimated as a constant value. In the described embodiment of the invention, it is simply assumed that the innovative codebook reduces the distortion D by a constant factor. Thus, the distortions obtained in step 116 for each subframe may be multiplied in step 118 by a constant factor, such as a constant factor in the order of 0 to 1, such as 0.055.

In step 120 calculation of the segmental SNR takes place. In each sub-frame, the SNR is calculated as the ratio of the weighted audio signal energy and the distortion D. The segmental SNR is then the mean of the SNR of the four sub-frames and may be indicated in dB.

This approach permits estimation of the second SNR which would be obtained when actually encoding and decoding the subject frame using the ACELP algorithm, however without having to actually encode and decode the audio signal and, therefore, with a strongly reduced complexity and reduced computing time.

The first and second estimators 12 and 14 output the estimated segmental SNRs 46, 50 to the controller 16 and the controller 16 takes a decision which algorithm is to be used for the associated portion of the audio signal based on the estimated segmental SNRs 46, 50. The controller may optionally use a hysteresis mechanism in order to make the decision more stable. For example, the same hysteresis mechanism as in the closed-loop decision may be used with slightly different tuning parameters. Such a hysteresis mechanism may compute a value "dsnr" which can depend on the estimated segmental SNRs (such as the difference therebetween) and other parameters, such as statistics about previous decisions, the number of temporally stationary frames, and transients in the frames.

Without a hysteresis mechanism, the controller may select the encoding algorithm having the higher estimated SNR, i.e. ACELP is selected if the second estimated SNR is higher less than the first estimated SNR and TCX is selected if the first estimated SNR is higher than the second estimated SNR. With a hysteresis mechanism, the controller may select the encoding algorithm according to the following decision rule, wherein acelp_snr is the second estimated SNR and tcx_snr is the first estimated SNR:

if acelp_snr+dsnr>tcx_snr then select ACELP, otherwise select TCX.

Accordingly, embodiments of the invention permit for estimating segmental SNRs and selection of an appropriate encoding algorithm in a simple and accurate manner.

In the above embodiments, the segmental SNRs are estimated by calculating an average of SNRs estimated for respective sub-frames. In alternative embodiments, the SNR of a whole frame could be estimated without dividing the frame into sub-frames.

Embodiments of the invention permit for a strong reduction in computing time when compared to a closed-loop selection since a number of steps involved in the closed-loop selection are omitted.

Accordingly, a large number of steps and the computing time associated therewith can be saved by the inventive approach while still permitting selection of an appropriate encoding algorithm with good performance.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Embodiments of the apparatuses described herein and the features thereof may be implemented by a computer, one or more processors, one or more micro-processors, field-programmable gate arrays (FPGAs), application specific integrated circuits (ASICs) and the like or combinations thereof, which are configured or programmed in order to provide the described functionalities.

Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or programmed to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for selecting one of a first encoding algorithm comprising a first characteristic and a second encoding algorithm comprising a second characteristic for encoding a portion of an audio signal to acquire an encoded version of the portion of the audio signal, comprising:

a first estimator for estimating a first quality measure for the portion of the audio signal, which is associated with the first encoding algorithm, without actually encoding and decoding the portion of the audio signal using the first encoding algorithm;

a second estimator for estimating a second quality measure for the portion of the audio signal, which is associated with the second encoding algorithm, without actually encoding and decoding the portion of the audio signal using the second encoding algorithm; and a controller for selecting the first encoding algorithm or the second encoding algorithm based on a comparison between the first quality measure and the second quality measure, wherein the second estimator is configured to determine an estimated adaptive codebook distortion for each sub-portion of a plurality of sub-portions of the portion of the audio signal, and wherein the second estimator is further configured to take an innovative codebook into consideration by reducing the estimated adaptive codebook distortion determined for each sub-portion of the portion of the audio signal using a constant factor.

2. The apparatus of claim 1, wherein the first encoding algorithm is an encoding algorithm better suited for music-like and noise-like signals and the second algorithm is an encoding algorithm better suited for speech-like and transient-like signals.

3. The apparatus of claim 2, wherein the first encoding algorithm is a transform coding algorithm, a MDCT (modified discrete cosine transform) based coding algorithm or a TCX (transform coding excitation) coding algorithm and wherein the second encoding algorithm is a CELP (code excited linear prediction) coding algorithm or an ACELP (algebraic code excited linear prediction) coding algorithm.

4. The apparatus of claim 1, wherein the first and second estimators are configured to estimate the respective quality measure based on a portion of a weighted version of the audio signal.

5. The apparatus of claim 1, wherein the first and second quality measures are SNRs (signal to noise ratio) or segmental SNRs of a portion of a weighted version of the audio signal.

6. The apparatus of claim 1, wherein the first and second estimators are configured to estimate the respective quality measure based on the energy of a portion of a weighted version of the audio signal and based on an estimated distortion introduced when encoding the signal portion by the respective algorithm, wherein the first and second estimators are configured to determine the estimated distortions dependent on the energy of a portion of a weighted version of the audio signal.

7. The apparatus of claim 1, wherein the first estimator is configured to determine an estimated quantizer distortion which a quantizer used in the first encoding algorithm would introduce when quantizing the portion of the audio signal and to estimate the first quality measure based on an energy of a portion of a weighted version of the audio signal and the estimated quantizer distortion.

8. The apparatus of claim 7, wherein the first estimator is configured to estimate a global gain for the portion of the audio signal such that the portion of the audio signal would produce a given target bitrate when encoded with a quantizer and an entropy coder used in the first encoding algorithm, wherein the first estimator is further configured to determine the estimated quantizer distortion based on the estimated global gain.

9. The apparatus of claim 7, wherein the first quality measure is a segmental SNR of a portion of the weighted audio signal and wherein the first estimator is configured to estimate the segmental SNR by calculating an estimated SNR associated with each of a plurality of sub-portions of the portion of the weighted audio signal based on an energy of the corresponding sub-portions of the weighted audio signal and the estimated quantizer distortion and by calculating an average of the SNRs associated with the sub-portions of the portion of the weighted audio signal to acquire the estimated segmental SNR for the portion of the weighted audio signal.

10. The apparatus of claim 1, wherein the second estimator is configured to determine an estimated adaptive codebook distortion which an adaptive codebook used in the second encoding algorithm would introduce when using the adaptive codebook to encode the portion of the audio signal, and wherein the second estimator is configured to estimate the second quality measure based on an energy of a portion of a weighted version of the audio signal and the estimated adaptive codebook distortion.

11. The apparatus of claim 10, wherein, for each of the plurality of sub-portions of the portion of the audio signal, the second estimator is configured to approximate the adaptive codebook based on a version of the sub-portion of the weighted audio signal shifted to the past by a pitch-lag determined in a pre-processing stage, to estimate an adaptive codebook gain such that an error between the sub-portion of the portion of the weighted audio signal and the approximated adaptive codebook is minimized, and to determine the estimated adaptive codebook distortion based on the energy of an error between the sub-portion of the portion of the weighted audio signal and the approximated adaptive codebook scaled by the adaptive codebook gain.

12. The apparatus of claim 11, wherein the second quality measure is a segmental SNR of the portion of the weighted audio signal, and wherein the second estimator is configured to estimate the segmental SNR by calculating an estimated SNR associated with each sub-portion based on the energy of the corresponding sub-portion of the weighted audio signal and the estimated adaptive codebook distortion and by calculating an average of the SNRs associated with the sub-portions to acquire the estimated segmental SNR for the portion of the weighted audio signal.

13. The apparatus of claim 10, wherein the second estimator is configured to approximate the adaptive codebook based on a version of the portion of the weighted audio signal shifted to the past by a pitch-lag determined in a pre-processing stage, to estimate an adaptive codebook gain such that an error between the portion of the weighted audio signal and the approximated adaptive codebook is minimized, and to determine the estimated adaptive codebook distortion based on the energy of an error between the portion of the weighted audio signal and the approximated adaptive codebook scaled by the adaptive codebook gain.

14. The apparatus of claim 1, wherein the controller is configured to utilize a hysteresis in comparing the estimated quality measures.

15. An apparatus for encoding a portion of an audio signal, comprising the apparatus according to claim 1, a first encoder stage for performing the first encoding algorithm and a second encoder stage for performing the second encoding algorithm, wherein the apparatus for encoding is configured to encode the portion of the audio signal using the first encoding algorithm or the second encoding algorithm depending on the selection by the controller.

16. A system for encoding and decoding comprising an apparatus for encoding according to claim 15 and a decoder configured to receive the encoded version of the portion of the audio signal and an indication of the algorithm used to encode the portion of the audio signal and to decode the encoded version of the portion of the audio signal using the indicated algorithm.

17. A method for selecting one of a first encoding algorithm comprising a first characteristic and a second encoding algorithm comprising a second characteristic for encoding a portion of an audio signal to acquire an encoded version of the portion of the audio signal, comprising:

- estimating a first quality measure for the portion of the audio signal, which is associated with the first encoding algorithm, without actually encoding and decoding the portion of the audio signal using the first encoding algorithm;
- estimating a second quality measure for the portion of the audio signal, which is associated with the second encoding algorithm, without actually encoding and decoding the portion of the audio signal using the second coding algorithm; and
- selecting the first encoding algorithm or the second encoding algorithm based on a comparison between the first quality measure and the second quality measure,
- wherein estimating the second quality measure comprises determining an estimated adaptive codebook distortion for each sub-portion of a plurality of sub-portions of the portion of the audio signal, and taking an innovative codebook into consideration by reducing the estimated adaptive codebook distortion determined for each sub-portion of the portion of the audio signal using a constant factor.

18. A non-transitory digital storage medium having a computer program stored thereon to perform, when said computer program is run by a computer, a method for selecting one of a first encoding algorithm comprising a first characteristic and a second encoding algorithm comprising a second characteristic for encoding a portion of an audio signal to acquire an encoded version of the portion of the audio signal, comprising:

- estimating a first quality measure for the portion of the audio signal, which is associated with the first encoding algorithm, without actually encoding and decoding the portion of the audio signal using the first encoding algorithm;
- estimating a second quality measure for the portion of the audio signal, which is associated with the second encoding algorithm, without actually encoding and decoding the portion of the audio signal using the second coding algorithm; and
- selecting the first encoding algorithm or the second encoding algorithm based on a comparison between the first quality measure and the second quality measure, wherein estimating the second quality measure comprises determining an estimated adaptive codebook distortion for each sub-portion of a plurality of sub-portions of the portion of the audio signal, and taking an innovative codebook into consideration by reducing the estimated adaptive codebook distortion determined for each sub-portion of the portion of the audio signal using a constant factor.

* * * * *